June 13, 1944.  A. W. OEHLER  2,351,144

PICKUP MECHANISM

Filed Aug. 11, 1943

INVENTOR.
ALVIN W. OEHLER
BY
ATTORNEYS

Patented June 13, 1944

2,351,144

UNITED STATES PATENT OFFICE 2,351,144

PICKUP MECHANISM

Alvin W. Oehler, Moline, Ill., assignor to Deere & Company, Moline, Ill., a corporation of Illinois Application August 11, 1943, Serial No. 498,439

6 Claims. (Cl. 56—364)

The present invention relates generally to pick-up mechanisms and more particularly to a windrow pick-up device of the flexible endless belt type, and is in the nature of an improvement over Patent No. 2,253,797, granted August 26, 1941, to Melroe. The Melroe patent discloses a pick-up device having one or more flexible endless belts, on which are attached rows of resilient crop engaging finger members, each of which is independently attached to the flexible belt to provide individual flexing action. Each finger member is provided with a pair of tines attached to the belt through resilient coils, the tines extending tangentially from the coils in a trailing direction relative to the movement of the belt.

While this type of pick-up device operates satisfactorily under most conditions, there are certain conditions, such as when harvesting in the presence of vines and excess weeds, in which difficulties are encountered due to the vines and weeds becoming entangled with the spring coils on the finger members.

The principal object of the present invention relates to the provision of means for preventing the vines and weeds from becoming entangled with the spring coils and with the attaching bolts for the finger members. Other objects will be apparent after a consideration of the following description, in which reference is had to the drawing appended hereto, in which.

Figure 1:
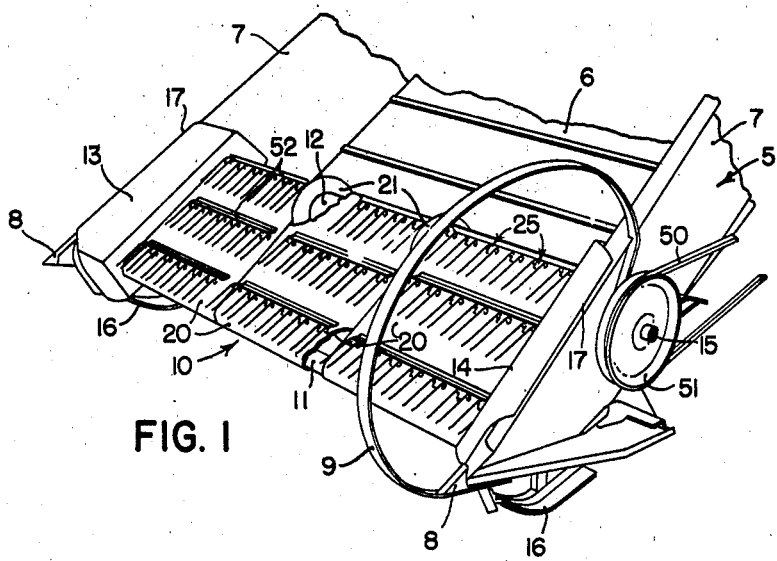
Figure 1 is a perspective view of the forward end of a harvester platform on which is mounted a pick-up device embodying the principles of my invention.
Figure 2:
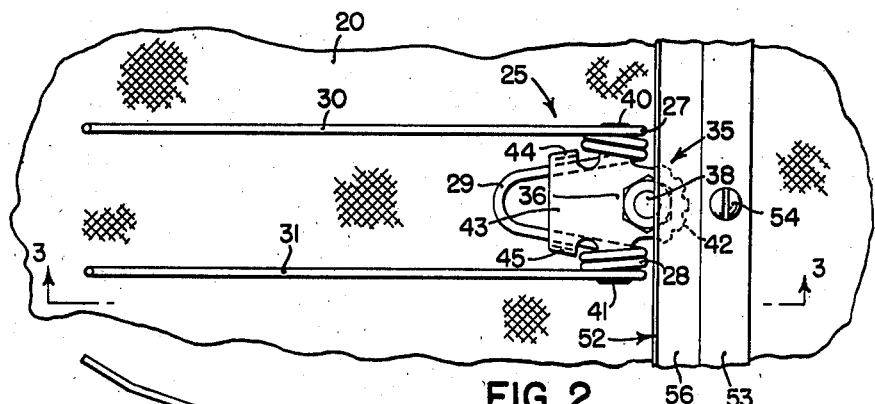
Figure 2 is a plan view, drawn to an enlarged scale, of a portion of the pick-up belt and one of the finger members, with a vine shielding device embodying my invention.

Referring now to the drawing, the harvester platform is indicated in its entirety by reference numeral 5 and is of the conventional scoop shovel type having a downwardly and forwardly inclined grain pan on which is supported a canvas platform conveyor 6, the upper flight of which moves upwardly and rearwardly between a pair of generally vertical side walls 7. The side walls 7 are extended forwardly to serve as dividers 8, the stubbleward divider having a bow type divider 9 mounted thereon, as is known to those skilled in the art.

The windrow pick-up device is indicated in its entirety by reference numeral 10 and comprises a pair of fore and aft spaced transversely disposed rollers 11, 12. The rollers are journaled in a pair of laterally spaced sheet metal supporting members 13, 14 and the rear roller 12 is mounted on a shaft 15, which is extended laterally beyond the supporting members 13, 14 and through suitable openings (not shown) provided in the side walls 7, by virtue of which the entire pick-up device 10 is pivotally hung from the side walls 7 for vertical swinging movement about the axis of the shaft 15. The forward ends of the supporting members 13, 14 are provided with ground engaging shoes 16, which float along the ground during operation and gauge the forward end of the pick-up device to maintain the same at a constant height above the ground. The pick-up device is prevented from dropping too far when the harvester platform is raised, by means of outwardly turned flanges 17 on the members 13, 14, which flanges lie over the upper edges of the side walls 7 and serve as stops against downward movement of the pick-up device.

A flexible endless belt 20 is trained over the front and rear rollers 11, 12 and is formed in three separate sections placed edge to edge and separated by collar plates 21 on the upper roller 12. The collar plates 21 guide the belts 20 and prevent them from overlapping.

Attached to each of the belts 20 is a plurality of rows of resilient finger members 25, each of which comprises a spring steel wire in the form of a pair of spaced coaxial coils 27, 28, interconnected by a U-shaped loop 29, and having a pair of tines 30, 31 extending tangentially from the outer ends of the coils, in the same direction as the loop 29 but spaced above the latter by virtue of the fact that the tines are tangent to the coils at points substantially diametrically opposite from the ends of the loop 29.

The toothed member 25 is attached to the belt by means of a securing clip, indicated generally by reference numeral 35, which comprises a central portion 36 having an aperture adapted to receive a securing bolt 28, which passes through aligned apertures in the clip and belt. The clip 35 is secured rigidly to the bolt 38 by a nut 39.

The clip 35 is provided with a pair of laterally extending wing portions 40, 41, extending from opposite sides of the central section 36, and extending through the coils 27, 28, respectively, which encircle the wings 40, 41 in assembled relation. The coils are placed over the wings by spreading the U-shaped loop 29 apart until the coils can be placed over the ends of the wings.

One end of the central section 36 is formed in an arc about the center of the bolt 38 and has a downwardly turned flange 42 which is notched to provide an arcuate row of teeth, which are sharpened to cause them to embed themselves into the belt 20 when the nut 39 is tightened on the bolt 38. These teeth prevent the spring tooth member 6 and clip 35 from rotating about the axis of the bolt 38 during operation. The clip 35 is provided with a longitudinally extending body 43 opposite the toothed flange 42, which overlies the U-shaped loop 29 and has a pair of downwardly turned flanges 44, 45, straddling the loop 29. The flanges bear upon the surface of the belt and serve to space the body portion 43 of the clip with a slight clearance above the loop 29 to permit a small amount of vertical movement of the loop during operation.

It will be noted that during operation the belt 20 is rotated around the two rollers 11, 12 in such a direction that the upper flight of the belt moves upwardly and rearwardly in the usual manner. The belt is rotated by power transmitted through a V-belt 50, which is trained over a sheave 51 fixed to the end of the shaft 15. Thus, the attached ends of the finger members 25 are the leading ends of the latter, while the tines 30, 31 extend in a trailing direction at an outwardly inclined position relative to the belt 20.

Figure 3:
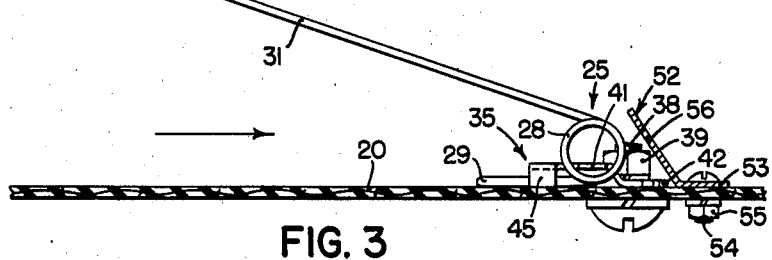
Figure 3 is a sectional view taken along a line 3—3 in Figure 2.

In order to prevent vines and other vegetation from entangling with the spring coils 27, 28 and the attaching bolts 38, shielding bars 52 are provided ahead of each row of finger members. Each shielding bar 52 has an angular cross section and is provided with a supporting flange 53, which lies against the belt 20 and is secured thereto by bolts 54 and nuts 55 spaced at intervals along the bars 52. The bars have shielding flanges 56 disposed at an obtuse angle to each of the supporting flanges 53 and are thus inclined in a trailing direction over the forward ends of the finger members 25 in a manner so as to shield the bolts 38 and springs 27, 28 as the belt moves the latter forwardly through the vines and other vegetation in the direction indicated by the arrow in Figure 3. It should be noted that the bars are attached to the belt separately from the finger members so that there is some relative movement between the bars and the finger members as the belt travels around the rollers. This relative movement helps to work out any vegetation or stones that may lodge between the bars and the coils.

I claim:

1. In a pick-up device for a harvester, comprising a flexible endless belt adapted to travel upwardly and rearwardly to deliver crops to said harvester during operation, the combination of a plurality of transverse rows of resilient fingers attached at their leading ends to said belt and unsupported at their trailing ends, and a plurality of vine shields for said fingers, each of said shields comprising a bar disposed transversely on said belt along the leading ends of said fingers and having a shielding portion extending outwardly from said belt ahead of the attached ends of said fingers for preventing vines and other vegetation from being caught on said fingers.

2. In a pick-up device for a harvester, comprising a flexible endless belt trained over a pair of transversely disposed, fore and aft spaced rollers, the upper flight of said belt being adapted to move rearwardly to deliver crops to said harvester during operation, the combination of a plurality of resilient fingers attached to said belt by means engageable adjacent one end of the fingers, the latter inclined away from said belt in the trailing direction, and means for preventing vines and other vegetation from becoming entangled with the attached ends of said fingers and said attaching means comprising protecting members mounted on said belt adjacent the leading ends of said fingers and having shielding portions extending over said attached ends and attaching means.

3. The combination set forth in claim 2 including the further provision that each of said fingers includes an attaching portion, a spring coil portion and a tine portion, and said protecting member includes a shielding portion inclined over the leading end of said spring coil portion.

4. In a pick-up device for a harvester, comprising a flexible endless belt trained over a pair of transversely disposed, fore and aft spaced rollers, the upper flight of said belt being adapted to move rearwardly to deliver crops to said harvester during operation, the combination of resilient finger members, each comprising an attaching loop, a pair of spring coils at opposite sides of said loop, and tines extending generally tangentially from said tines, means attaching said loops to said belt, anad means for preventing vines and other vegetation from becoming entangled with said coils comprising flanged bars attached to said belt on the leading sides of said coils and having shielding flanges inclined outwardly from said belt over said coils.

5. In a pick-up device for a harvester, a flexible endless belt, a plurality of resilient fingers attached to said belt in transversely disposed rows and including spring coils adjacent the attached ends, and means for preventing vines and other vegetation from becoming entangled with said coils comprising a flanged bar for each row of fingers, each bar being angular and having one flange attached to said belt and another flange inclined away from the belt in front of said coils on said row of resilient fingers.

6. In a pick-up device for a harvester, a flexible endless belt, a plurality of spring finger members disposed in transverse rows on said belt, bolts for independently attaching each of said finger members to said belt providing for individual flexing movement relative thereto, and a shielding bar of angular cross section having a supporting flange bolted to said belt independently of said coils and a shielding flange extending outwardly from said belt over the leading ends of said finger members for preventing vines and other vegetation from becoming entangled with said fingers and said attaching bolts.

ALVIN W. OEHLER.